(No Model.)

G. W. BENNUM & J. L. McKIM.
EYEGLASSES.

No. 520,028. Patented May 22, 1894.

Witnesses

Inventors
George W. Bennum,
John L. McKim,
By Attorney
George W. Bennum

UNITED STATES PATENT OFFICE.

GEORGE W. BENNUM AND JOHN L. McKIM, OF GEORGETOWN, DELAWARE.

EYEGLASSES.

SPECIFICATION forming part of Letters Patent No. 520,028, dated May 22, 1894.

Application filed September 8, 1893. Serial No. 485,094. (No model.)

*To all whom it may concern:*

Be it known that we, GEORGE W. BENNUM and JOHN L. McKIM, citizens of the United States, residing at Georgetown, in the county of Sussex and State of Delaware, have invented certain new and useful Improvements in Eyeglasses; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in eyeglasses and it consists in the novel construction and combinations of parts hereinafter fully described and claimed.

Figure 1:
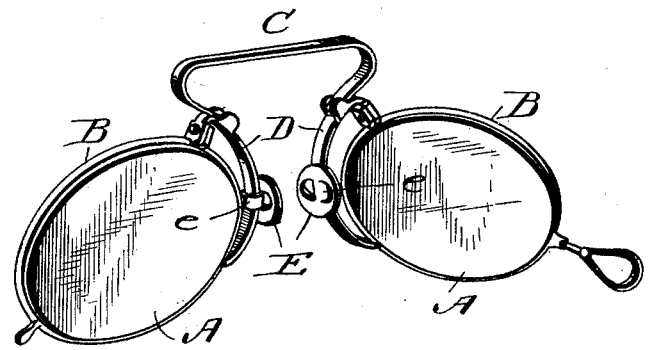
Figure 2:
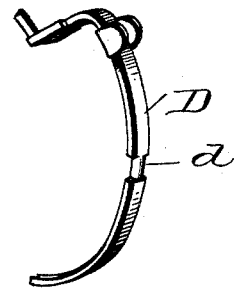
Figure 3:
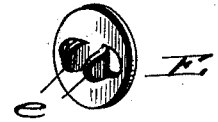

Figure 1 is a perspective view of a pair of eyeglasses of ordinary construction, showing the application of the invention. Fig. 2 is a detail view of a nose-piece, showing the reduced portions to which the plate or disk is applied and held from longitudinal movement thereon. Fig. 3 is a detail view of a plate or disk showing the position of the tongues prior to bending the same to embrace the nose-piece.

The eye glasses are of usual construction, and comprise the eye-pieces A, the rims B, the spring or bridge C connecting the eye-pieces, the nose-pieces D, and the ordinary fasteners for securing the said nose-pieces and spring, or bridge, to the rims of the eye-pieces. The plates or disks E are attached to the nose-pieces in any desired manner, so as to be free to turn thereon, and held against longitudinal movement. By this disposition of the said plates the relative position thereof is fixed, and the plates are free to turn to adapt themselves to the shape of the nose, and evenly distribute the pressure thereon. In the construction shown the nose-pieces have reduced portions $d$ provided by notching the edges of the nose pieces and the plates or disks have tongues $e$ which are bent to embrace the said reduced portions $d$. These tongues $e$ can be either punched or stamped from, or soldered, riveted or screwed on the plates or disks. The kind of material composing the said plates or disks is not essential and may be of metal or other material suitable for the purpose.

It will be understood that the plates or disks may be roughened or left smooth; or that they may be faced with suitable material, hard rubber, celluloid, metal, or other substance, which may be smooth or rough to suit the caprice of the maker and the wearer.

Having thus described our invention, what we claim, and desire to secure by Letters Patent, is—

In a pair of eye glasses, the combination with the nose pieces having reduced portions, of the self adjusting plates provided with tongues embracing said reduced portions, substantially as described.

In testimony whereof we affix our signatures in presence of two witnesses.

GEORGE W. BENNUM.
JOHN L. McKIM.

Witnesses:
GEORGE E. MESSICK,
JOHN J. MORRIS, Jr.